3,237,264
QUICK RELEASE FOR PARACHUTES
Pino G. Turolla, 315 N. Coconut Lane, Palm Island, Miami Beach, Fla.
Filed Nov. 12, 1963, Ser. No. 322,651
9 Claims. (Cl. 24—201)

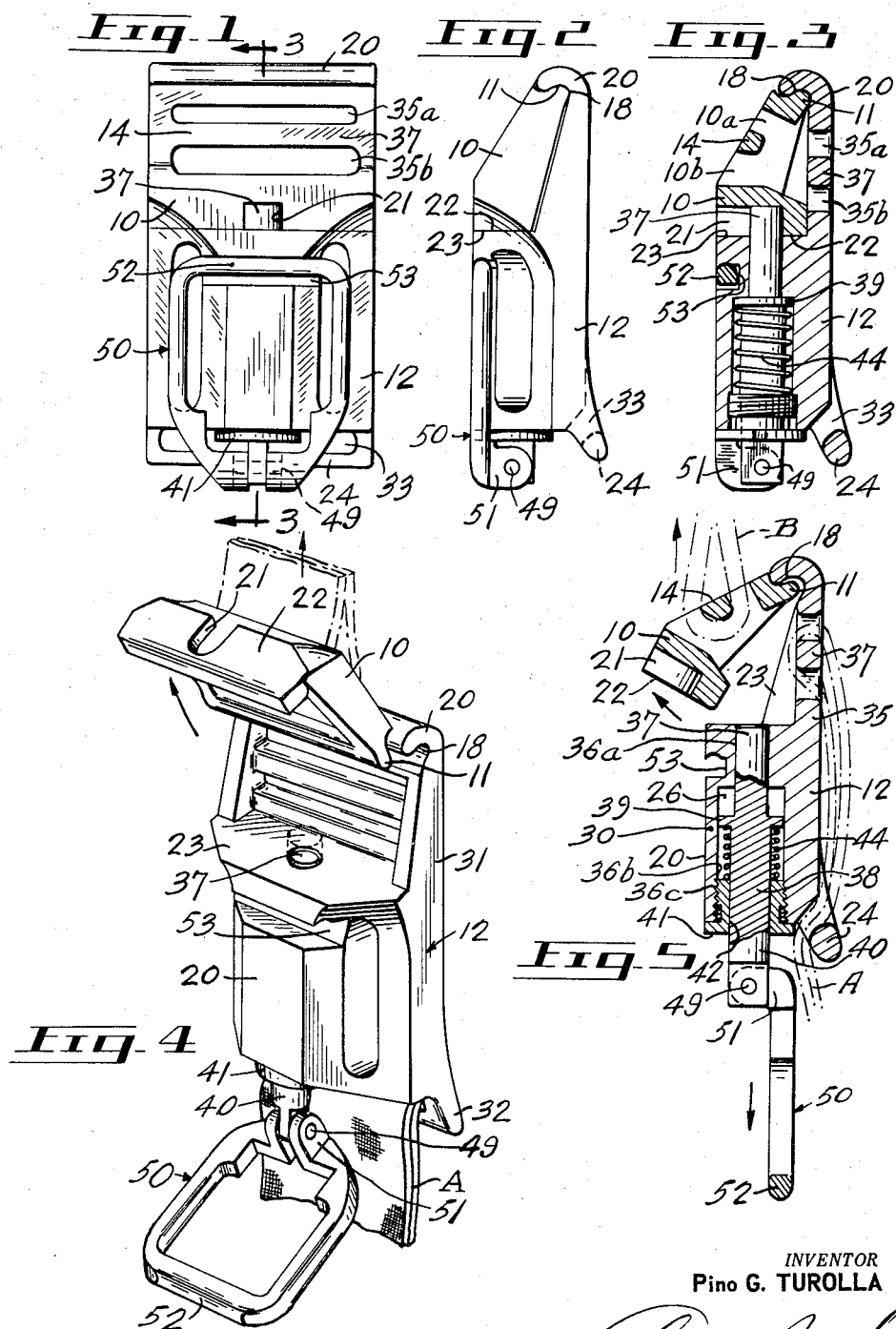

This is a continuation-in-part of application Serial No. 199,452, filed June 1, 1962, now Patent No. 3,141,215.

The present invention relates to improvements in the construction of parachutes and more particularly to an improved quick riser release whereby the chute may be deflated or completely released from the parachute harness.

An important factor in the safe landing of a person or of cargo from a parachute descent is the provision for immediate control of the deflation or, when necessary, the immediate release of the entire chute to avoid dragging of the person or cargo along the ground. As is well known, most injuries to parachutists occur when landings are attempted in high winds or over rough terrain and the parachutes are not "spilled" or released fast enough to prevent the user from being dragged along behind the open or partially open chute. Additionally, there are times when a flyer may be dropped into water, either with the plane or at the end of a parachute descent and, at such times, the quick easy removal of the entire pack or chute may be the difference between life and death.

There are certain requirements which must be considered in the construction of a quick release arrangement for a parachute harness. First and most obvious, is the requirement that the release should embody safety features which will prevent accidental release or failure when the chute is in the air. Further, such a quick release arrangement must be located in a position where the controls are readily accessible, and the controls must be constructed so as to require minimum effort for their operation.

The present invention is the result of thorough consideration of all the above requirements and the resultant problems and aims to provide a quick release arrangement that is adapted in one embodiment for an immediate and positive release of one or both of the usual harness risers from the shoulders, or cargo, after landing. This quick release creates an immediate deflation of the parachute canopy, consequently preventing any dragging of the load along the ground irrespective of wind velocity. In accordance with the invention, the quick riser release can be operated manually and/or is equally suited for automatic release.

More specifically, the quick riser release with which the present invention is concerned consists essentially of two main parts, namely, a male fitting release or "fly-away" that replaces the usual right and left riser slice eyes of a standard parachute construction, and a female fitting or H-ring ejector which replaces the usual right or left harness shoulder adapted on a parachute harness.

In accordance with the present invention, the male fitting or "fly-away" fits within a recess provided in the H-ring ejector and is releasably retained in position by a spring biased piston located within the body of the ejector. Means in the form of a compact folding release handle are connected to the piston so that the "fly-away" can be quickly and easily released. The "fly-away" portion, retaining H-ring ejector and release handle are designed as a compact unit without projecting parts.

As will be obvious by reference to the following description and accompanying drawings, the release of the invention is also applicable to the quick release of the entire parachute pack and/or the complete parachute when opened, by incorporation in standard parachute harnesses.

Having thus generally described the nature of the invention, particular reference will be made to the accompanying drawings, showing by way of illustration preferred embodiments thereof, and in which:

FIGURE 1 is a view in front elevation of a quick riser release arrangement in accordance with the invention as it would appear in secured and locked condition.

FIGURE 2 is a view in side elevation of the construction shown in FIGURE 1.

FIGURE 3 is a sectional view of the construction shown in FIGURE 1 along the line 3—3.

FIGURE 4 is a somewhat diagrammatic view in perspective elevation showing the releasing movement of the retaining piston under the pull applied to the release handle with the male fitting shown as flying out under the pull of a parachute riser or the like.

FIGURE 5 is an enlarged cross-sectional view corresponding substantially to FIGURE 4 showing the interior of the H-ring ejector to illustrate in more detail the arrangement of the fly-away fitting, the retaining piston and the release handle in release position.

With particular reference to the drawings, the main components of the present device consist of a male fitting or "fly-away" release 10 which, in a preferred embodiment, replaces the usual right or left riser slice eye of a parachute harness and a female fitting or ejector 12 which replaces the usual right or left shoulder harness adapted. As is shown in broken lines in FIGURE 5 for example, the fitting 12 is secured directly to the harness strap "A" while the release 10 is secured to the parachute riser "B." It will be understood that in this embodiment there would be a pair of riser release devices in accordance with the invention when used on a standard parachute harness replacing the usual left and right attachments but as these are identical, the following description refers to one such device only.

The "fly-away" release 10 is a somewhat wedge-shaped, one piece body that is provided with openings or recesses 10a, 10b with the intervening portion forming a bar 14 to which, in the use illustrated, the riser "B" is attached. The upper narrowest end of the release 10 is shaped as indictaed at 11 to hook into and against the correspondingly shaped inner surface 18 of a top portion 20 of the fitting 12 which serves as a pivot or fulcrum point about which the release 10 swings clear of the fitting 12 when released. The main body of the release 10 terminates in a lower flat surface 22 which fits within the corresponding recess 23 provided in the upper end of the fitting 12. The lower flat surface 22 includes a centrally disposed inwardly extending recess 21 adapted to receive the upper end of a release piston 38 as will be described.

As shown most clearly in FIGURES 3, 4, and 5, the fitting 12 is also made as a one piece metal body which is formed so as to have a main body portion 30 of substantially square cross-section which protrudes from a back portion 31 provided with an offset lower portion 32 which is recessed as indicated at 33, providing a loop or bar 24 through which the chute harness "A" is attached. The upper portion 35 of the back wall bordering the recess 23 is of an upwardly tapering formation terminating in the top portion 20 which is somewhat hook-shaped on its undersurface 18 as mentioned. The back wall portion 35 is recessed as indicated at 35a, 35 with the intervening portion 36 providing an attachment bar 37 to which the harness "A" is attached.

As shown most clearly in FIGURE 5, the main body portion 30 of the fitting 12 is bored axially to provide a cylinder 26 having a first portion 36a and a lower portion 36b of greater diameter terminating in a tapped portion 36c adapted to receive a threaded closure member 41. The piston 38 is preferably made as having a main body portion 37 having a diameter slidably fitting the cylinder portion 36a and an outstanding collar 39 of slightly less diameter than that of the larger cylinder portion 36b with a lower portion 40 slidably fitting through the threaded closure member 41 which is suitably bored as indicated at 42. The piston 38 is normally urged upwards within the cylinder 26 by a coil spring 44 which bears against the piston collar 39 and the closure member 41.

A handle 50 having an offset attachment lug 51 is pivotally connected, as indicated at 49, to the lower end 40 of the piston 38 which is reduced to a flat section at this point. The main body portion 30 of the fitting 12 is recessed trans-axially of the cylinder 36 so as to provide a substantially hook-shaped recess 53 adapted to receive the upper bar 52 of the handle 50 when the handle is swung up into folded position into alignment with the main body 30 of the fitting 12 as shown in FIGURES 2 and 3 for example. The location of the recess 53 relative to the lower end of the piston 38 is designed so that the handle 50 is under upward resilient tension against the recess 53 by the piston bearing spring 44. With this arrangement, the handle 50 resiliently snaps into place when placed in the closed position as shown in FIGURE 2, with the fitting 10 retained with the recess 23 of the fitting 12 by the engagement of the end of the piston portion 37 in the recess 21. To release the fitting 10 the handle 50 is pulled out and down against the resistance of the coil spring 44, drawing the piston end 37 out of engagement with the fitting recess 21 so that the fitting 10 is free to swing out and clear from the top loop or hook 20 of the fitting 12.

The design of the present fitting is such that the outer contours of the assembled fittings 10, 12 and the handle 50 when in closed position, present no outstanding or projecting parts and the slightly arcuate formation of the back wall 31 permits the release to fit flatly against the body of the user. It will also be noted that in the preferred construction illustrated the outer surface of the fitting 12 is shaped and is provided with recesses 55a, 55b at each side of the main body 30 and extending through the body to provide additional means for attachment and to lighten the fitting 12. An important feature of this shaping is to provide space beneath the sides of the handle 50 providing ready access to the fingers for grasping the handle pulling it into release position. This is extremely important in a device of this nature in that when a release is necessary, it is often under conditions where it is practically impossible to grasp and release a handle or control that requires several actions or is not readily accessible.

I claim:

1. A quick release attachment adapted for use with parachute constructions, comprising, a pair of separable units, one of said units comprising a holding fitting and the other of said units comprising a release fitting, said holding fitting having a one-piece body embodying means for attachment of a parachute harness strap and including an internal recess at one end adapted to entirely receive said release fitting, a resiliently biased catch means within said holding fitting body and including a first portion adapted to engage said release fitting when positioned within said body recess and a second portion extending beyond said body at the end remote from said catch means first portion, a release handle pivotally connected to said catch means second portion and adapted to fold flatly against said fitting body in locked position, said release fitting having a one-piece body embodying means for attaching a parachute strap and having top and bottom surfaces shaped to correspond with the internal recess of said holding fitting body, and a recess in said release fitting bottom surface adapted to receive said catch means first portion.

2. A quick release attachment as claimed in claim 1 wherein the upper portion of said holding fitting body recess is of a substantially hook-shaped formation and the top surface of said release fitting has a rounded projection fitting within said hook-shaped formation providing therewith a pivotal axis about which said release fitting turns on release from said fitting body recess.

3. A quick release attachment as claimed in claim 1 wherein said holding fitting body is bored axially forming a cylinder within said body and said resiliently biased catch means comprises a piston mounted for sliding movement within said cylinder, a coil spring mounted within said cylinder and acting to urged said piston outwardly of said cylinder, a portion of said piston extending beyond the lower end of said body to said attachment with said release handle.

4. A quick release attachment adapted for use with parachute constructions, comprising, a pair of separable units, one of said units comprising a holding fitting and the other of said units comprising a release fitting, said holding fitting having a one-piece body embodying means for attachment of a parachute harness strap and including an internal recess at one end adapted to entirely receive said release fitting, said holding fitting body internal recess being shaped to correspond with the external contours of said release fitting, a resiliently biased catch means within said holding fitting body and including a first portion adapted to engage said release fitting when positioned within said body recess and a second portion extending beyond said body at the end remote from said catch means first portion, a release handle pivotally connected to said catch means second portion and adapted to fold flatly against said fitting body in locked position, said release fitting having a one-piece body embodying means for attaching a parachute strap and having top and bottom surfaces shaped to correspond with the correspondingly shaped fitting receiving surfaces of said holding fitting body, and a recess in said release fitting bottom surface adapted to receive said catch means first portion.

5. A quick release attachment as claimed in claim 4 wherein the upper portion of said holding fitting body recess is of a substantially hook-shaped formation and the top surface of said release fitting has a rounded projection fitting within said hook-shaped formation providing therewith a pivotal axis about which said release fitting turns on release from said fitting body recess.

6. A quick release attachment as claimed in claim 4 wherein said holding fitting body is bored axially forming a cylinder within said body and said resiliently biased catch means comprises a piston mounted for sliding movement within said cylinder, a coil spring mounted within said cylinder and acting to urge said piston outwardly of said cylinder, a portion of said piston extending beyond the lower end of said body to said attachment with said release handle.

7. A quick release attachment adapted for use in parachute constructions, comprising, a pair of separable units, one of said units comprising a holding fitting and the other of said units comprising a release fitting, said holding fitting having a one-piece body including a forwardly, projecting portion of substantially rectangular outline and a back portion also of substantially rectangular outline extending above and below said forward portion, said back extended portions embodying means for attachment of a parachute strap, said holding body including an internal recess defined by the upper surface of said forward projection and the inner surface of the upper one of said back portion extensions and shaped to conform with the outer contours of and to entirely receive said release fitting, said holding body forwardly projecting portion being bored axially forming a cylinder within said body, a piston slidably mounted within said body portion and including a first portion extending above said body and adapted for engagement with an adjacent portion of said release fitting and a second portion extending below said body, a coil spring mounted within said body and acting to urge said piston first portion outwardly of said body cylinder, a release handle pivotally connected to said piston second extending portion and being adapted to fold flatly against said holding fitting forward portion in locked position, said release fitting having a one-piece body of substantially wedge-shaped outline embodying means for attachment of a parachute strap and having top and bottom surfaces shaped to correspond with the said holding body upper surface and the inner surface of said holding fitting back portion and a recess in said release fitting body bottom surface adapted to receive said piston first extending portion.

8. A quick release attachment as claimed in claim 7 wherein said holding fitting forward portion is provided with a substantially hook-shaped inwardly extending recess extending transversely across said body beneath said forward portion upper surface and said release handle includes a transverse bar fitting within said recesses and being resiliently retained therein by the action of said coil spring urging said piston upwardly.

9. A quick release attachment as claimed in claim 7 wherein the upper portion of said holding fitting body recess is of a substantially hook-shaped formation and the top surface of said release fitting has a rounded projection fitting within said hook-shaped formation providing therewith a pivotal axis about which said release fitting turns on release from said fitting body recess.

References Cited by the Examiner
UNITED STATES PATENTS

| | | |
|---|---|---|
| 699,398 | 5/1902 | Larsen. |
| 1,565,678 | 12/1925 | Severson. |

WILLIAM FELDMAN, *Primary Examiner.*

B. GELAK, *Assistant Examiner.*